United States Patent [19]

Swaim et al.

[11] Patent Number: 5,187,740

[45] Date of Patent: Feb. 16, 1993

[54] METHOD AND APPARATUS FOR TELEPHONE CALL REORIGINATION

[75] Inventors: Joe T. Swaim, McLean; Donald C. Heckman, Alexandria; Kenneth J. O'Grady, Annandale, all of Va.; Guido M. Eastep, Rockville, Md.

[73] Assignee: MCI Communications Corporation, Washington, D.C.

[21] Appl. No.: 769,287

[22] Filed: Oct. 1, 1991

[51] Int. Cl.[5] ............... H04M 3/42; H04M 17/00; H04M 3/00
[52] U.S. Cl. ................... 379/209; 379/144; 379/201; 379/351; 379/355; 379/386
[58] Field of Search ............. 379/209, 355, 67, 88, 379/91, 386, 97, 201, 216, 351, 372, 144

[56] References Cited

U.S. PATENT DOCUMENTS

| | | | |
|---|---|---|---|
| 4,126,768 | 11/1978 | Grenzow | 379/357 |
| 4,332,985 | 6/1982 | Samuel | 379/355 |
| 4,513,175 | 4/1985 | Smith | 379/355 |

FOREIGN PATENT DOCUMENTS 0013793 1/1986 Japan ................... 379/386

Primary Examiner—James L. Dwyer
Assistant Examiner—Harry S. Hong
Attorney, Agent, or Firm—Ormand R. Austin

[57] ABSTRACT

The invention is an adaptive method and apparatus for telephone call reorigination (i.e., the placement of successive calls without extended re-dialing). It allows shorter, uniform DTMF reorigination requests or commands to be recognized and responded to during certain stages of a call while preserving a filtering effect to avoid "talk off" reorigination during the call's talking stage. In the initial stage of a call, prior to verifying the caller's authority to place the call, a first mode of request detection, responsive to short duration tones is used. During call setup and prior to answer by a called party, a second mode of detection is used which is also responsive to short duration tones. In the talking stage, another mode of detection is used to avoid inadvertent reoriginations due to spurious tones. In one aspect, a dial tone is automatically returned to the caller upon called party disconnect.

12 Claims, 3 Drawing Sheets

METHOD AND APPARATUS FOR TELEPHONE CALL REORIGINATION

This invention relates to methods and apparatus for rapid reorigination of certain telephone calls, such as credit card calls, without the necessity of redialing the entire sequence of access and call authorization digits.

BACKGROUND OF THE INVENTION

The usual way of making a long distance telephone call by credit card is to first enter the long distance carrier's seven-digit access code, either alone or as an "800" number call. In either case, this obtains an audible dial tone which cues the caller to dial 0+Area Code+-phone number called. With that properly done, an authorization code, usually of fourteen digits, must be entered. This authorization code is typically the caller's credit card number. Upon completion, the caller has entered a total of no less than thirty-two digits.

To overcome the obvious drawbacks of having to re-enter all of these digits to reoriginate a call (i.e., to place another call), a feature has been available from at least one of the long distance carriers whereby, prior to calling party disconnect (i.e., the calling party hanging up), a single key input from the caller's push-button phone is used to avoid a total reset which would require re-entry of all digits. The single key used for this purpose is the # key, commonly referred to as the "pound sign" key.

This key generates a particular set of tones which is recognized as a reorigination request, causing a dial tone to be returned to the caller without the need for re-entry of the credit card number or of the long distance company's access code. The caller simply redials the area code and called party number after having used the # key. Multiple calls can be successively made without the need to regain access and re-enter the calling card number for each successive call.

While reorigination in this manner has been a significant improvement, certain problems have arisen in the rapidly changing telecommunications environment to defeat the total effectiveness of the present techniques.

At present, to achieve reorigination, the # key must remain depressed for a period of at least 800 milliseconds. This tone period is relatively long and was chosen to avoid spurious reorigination that can occur during the talking phase of a call (i.e., between answer and disconnect). The long duration serves effectively as a filter to prevent voice and background incidental tones from causing "talk off" of the system into reorigination.

While the long tone duration effectively avoids spurious reorigination of this kind, in certain stages of the call it is desirable to be responsive to short duration inputs since not all callers can be counted on to hold the key depressed for the full period. More importantly, however, certain telephone equipment, such as the newer PBXs and car phones, produce tone duration times of a fixed length irrespective of how long a key is actually depressed. These uniform pulses are typically quite short, an on the order of 70 milliseconds or so. The effect is that reorigination is rendered useless by this latest equipment since the short duration tones simply go undetected.

Thus, it is among the objects of the present invention to provide an adaptive reorigination method and apparatus which responds to shorter, uniform tone durations during certain stage of the call while preserving the longer filtering effect to avoid "talk off" reorigination during the talking stage (i.e., the communication stage) of the call.

It is also among the objects of the invention that it be adaptable to either automatically return dial tone to the credit card caller once the called party hangs up, so that reorigination can occur directly without the need to use the reorigination key at all in those circumstances, or to require use of a positive reorigination command.

SUMMARY OF THE INVENTION

Briefly summarized, these and other objects are attained in a method and system wherein the caller's request (or command) for reorigination is detected and treated differently, depending on the stage of a call's progression.

In a preferred embodiment, during the initial stage of a call, prior to verification of the caller's authority to place the call, a first mode of request detection is used which is responsive to short duration tones entered from the caller's phone. Upon detection of a request at this stage, since verification has not been achieved, the call is simply reset. That is, the caller is required to process through verification, although once carrier access is attained there is no need to redial the seven digit access code or 800 number.

Following initial verification, in a second stage of the call (and for each succeeding call thereafter), prior to answer by the called party (i.e., including while ringing or delivery of a busy signal), a mode of detection is applied which remains responsive to short duration request tones to cause reorigination to be permitted. In this stage, the request is granted by return of dial tone to the caller to permit immediate entry of the next called number.

Once the called party has answered, and prior to disconnect, in a third stage of a call, a mode of detection for a reorigination request is used which is responsive only to longer duration tones. In this stage the necessary duration of the tone for achieving reorigination is selected so that it is sufficiently long enough to avoid spurious reorigination from voice and background tones. Notably, in this third, or talking stage, of the call, it is relatively infrequent that a reorigination request would be made. Advantageously, the invention prevents talk off, but still allows reorigination at the most appropriate times (i.e., before answer and after disconnect).

Optionally, in a further, preferred form of the invention, once a called party disconnects, a dial tone is automatically returned to the caller. Reorigination is thus automatically granted in that event without request.

For the invention, an integrated dual tone multifrequency (DTMF) receiver (or ITR herein) may be used in the first stage of the call for request detection, with a discrete DTMF receiver (DTR) used in the second stage, and a scanning tone receiver (STR) used in the third stage.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

DETAILED DESCRIPTION OF THE INVENTION

Figure 1:
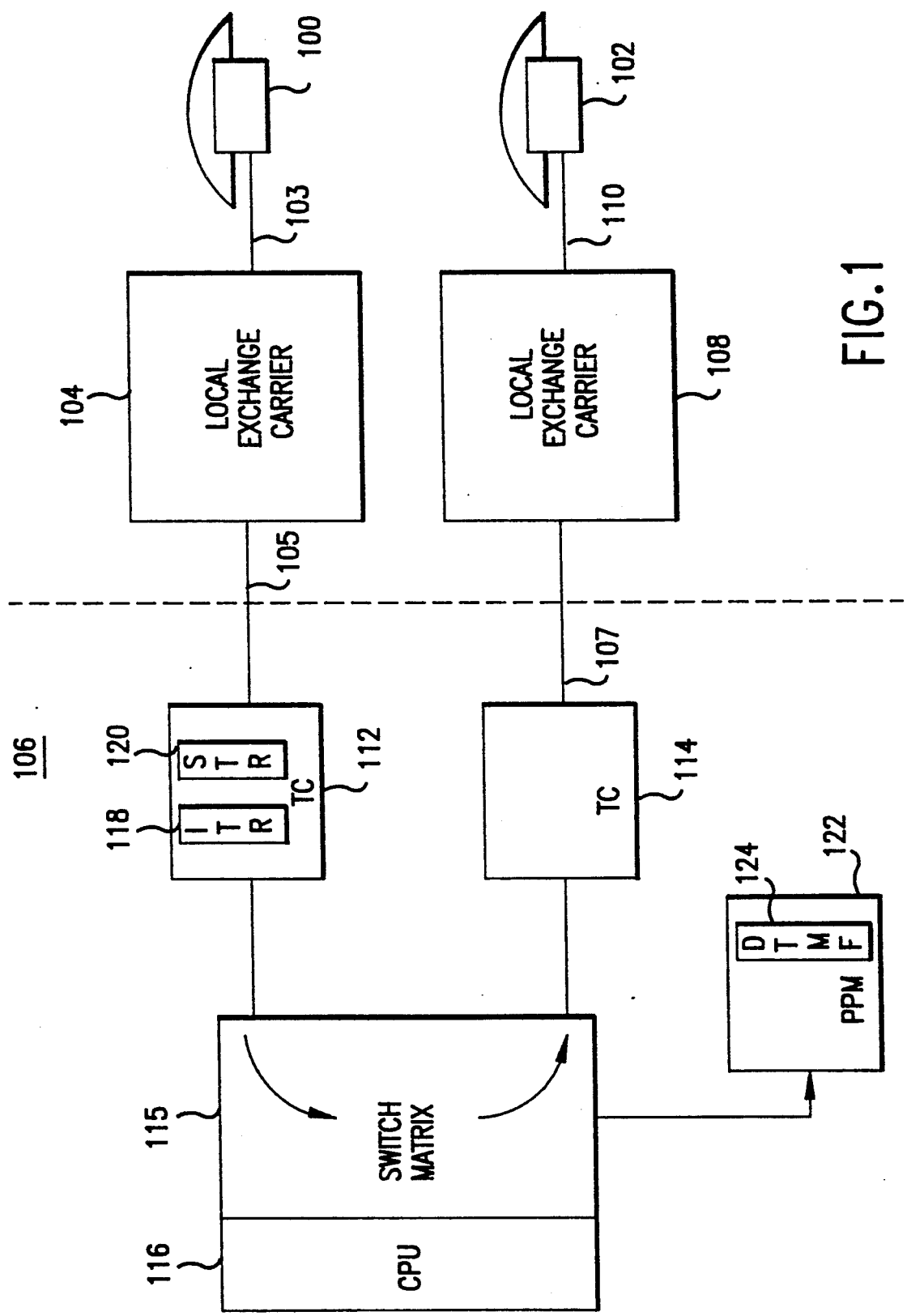
FIG. 1 is a block diagram illustrating one form of the invention, shown used in an end-to-end telephone connection for a known switching system.

For descriptive purposes, and in connection with FIG. 1, it is assumed that a caller using telephone 100 desires to place a long distance call, for example by using the caller's credit card, to a called party who is expected to answer at telephone 102.

At any time during the period that the telephone 100 is "off hook" it may be expected that the caller at that telephone may request to "reoriginate" a call. While this term may take somewhat different meanings depending on the context, generally it will be taken herein to mean that the caller desires to place another call without going through an on-hook to off-hook cycle each time. A reorigination request will be assumed to be entered by the caller's activation of the # key on the DTMF telephone 100.

The general path of the call is from telephone 100 over local loop 103 to the first local exchange carrier 104 (i.e., the local telephone company). Access is provided by the local exchange 104, via a trunking system 105, to the long distance, or inter-exchange, carrier 106 selected by the caller. Access to a particular carrier for a credit card call is gained by the caller's entry of that carrier's seven digit access code or 800 number plus access code. The call is routed long distance by the carrier 106, by way of a second trunking system 107, ultimately to a local exchange 108 which provides the local loop 110 to telephone 102.

In this overall system, once inter-exchange carrier access is obtained, the local exchanges 104 and 108 are essentially conduits and the call is controlled by the inter-exchange carrier 106. For the inter-exchange carrier 106, a number of switching architectures and design philosophies may be used. The system schematically illustrated here is but one form of a known switching system wherein the invention will be useful. Included as part of the illustrative inter-exchange carrier's system are trunk controllers (TCs) 112 and 114 and a switching matrix 115. A central processing unit (CPU) 116, operative in accordance with a stored program of instructions, is used for overall control.

It will of course be understood that the long distance network may involve a number of switching units for total end-to-end connections, and, for example, that the TC units 112 and 114 may each be associated with different switching matrices. Each TC, such as TCs 112 and 114, includes a number of subcomponents, and for the present invention, each will be fitted with an integrated DTMF tone receiver (ITR) 118 and a scanning tone receiver (STR) 120. Also associated with the switching unit (comprising matrix 115 and CPU 116) is a peripheral processor module (PPM) 122 which includes at least one discrete DTMF receiver 124 as a subcomponent.

The CPU 116 is programmed to control not only the connection paths through the switching matrix 115, but also to control the peripheral units, such as TCs 112 and 114 and PPM 122.

In accordance with the invention, once access to the desired inter-exchange carrier is achieved by a caller at telephone 100, the CPU 116 directs the receive TC 112 to immediately place an integrated tone receiver 118 upon the line for receipt of tones generated at the telephone 100. The ITR 118 is a known item of telephone equipment whose function is to respond to DTMF tones. Since the ITR 118 is essentially dedicated to the assigned line during this initial interval of the call (i.e., following access to the desired carrier but prior to credit card verification), it is made responsive to relatively short duration tones (i.e., on the order of 70 msec and less).

During this phase of the call, before the credit card is verified (before authorization is granted), if a reorigination request is entered, the ITR 118 detects the DTMF tone and, with CPU 116, simply causes a "reset." That is, the carrier's dial tone is returned to the caller for re-entry of the called party's number and the credit card number. It is not necessary to re-enter the inter-exchange carrier's access code, provided that initial access has been attained.

Verification of the caller's credit card is signaled by a confirmation tone returned to the caller and commencement of ringing signals at the called phone 102. At that point in the call, simultaneous with confirmation, the CPU 116 directs the TC 112 to release the ITR 118 from the line and directs the switching matrix 115 to connect the DTMF receiver 124 across the connection so that it can then monitor the input from phone 100 to detect DTMF tone inputs. Like the ITR, the DTMF receiver 124 is capable of detecting short duration tones. Its substitution, however, releases the ITR 118 for immediate use in handling other calls and allows more efficient and economical use of the facilities. Thus, in this phase of the call, following verification, but prior to answer by the called party, a second mode of detection is provided for detection of reorigination requests.

A reorigination request during this phase is responded to by a return of dial tone, but the caller only has to enter the called party's number and need not re-enter the credit card number. Advantageously, the shorter duration reorigination requests from car phones, the more advanced PBXs, and other such equipment are responded to and not merely ignored as has been the case heretofore.

Once the called party at telephone 102 has answered, the CPU 116 directs removal of the DTMF receiver 124 from the line and causes STR 120 to be connected as a tone receiver for inputs from the caller's phone 100. The STR 120 is also a known item of telephone equipment which is operative to scan, or sample, a number of lines on a time shared basis. As a result of this operation, the STR is incapable of detecting the shorter duration DTMF tones (i.e., less than about 800 msec.) that might arrive as reorigination requests from the telephone 100. This is advantageous during the talking, or communications, phase of the call since the reorigination process is not inadvertently activated by "talking off" or by other spurious, short duration tones. A reorigination request is responded to, however, whenever the reorigination tone is of sufficient duration to be detected by the STR 120 (e.g., the # key is held depressed long enough).

If reorigination is so requested during the talking phase, it is granted by return of dial tone to the caller phone 100, and, under direction of the CPU 116, disconnection of the STR 120 and reconnection of a DTMF receiver, such as DTMF receiver 124. With each subsequently reoriginated call, once the talking phase begins, the DTMF receiver is replaced with an STR as has been described. That is, a mode of detection is used in that phase which is better adapted to the conditions of the communications phase.

In a preferred form of the invention, once a called party disconnects (i.e., hangs up) CPU 116 commands a dial tone to be automatically returned to the caller at phone 100 without the need for the caller to enter a reorigination request. In some cases, however, it may be desirable to require that the caller actually request reorigination (e.g., activate the # key) before dial tone is returned for placement of the next call. In either case, the mode of detection for the reorigination request may be the same and is preferably implemented with a discrete DTMF receiver as has been described.

Figure 2:
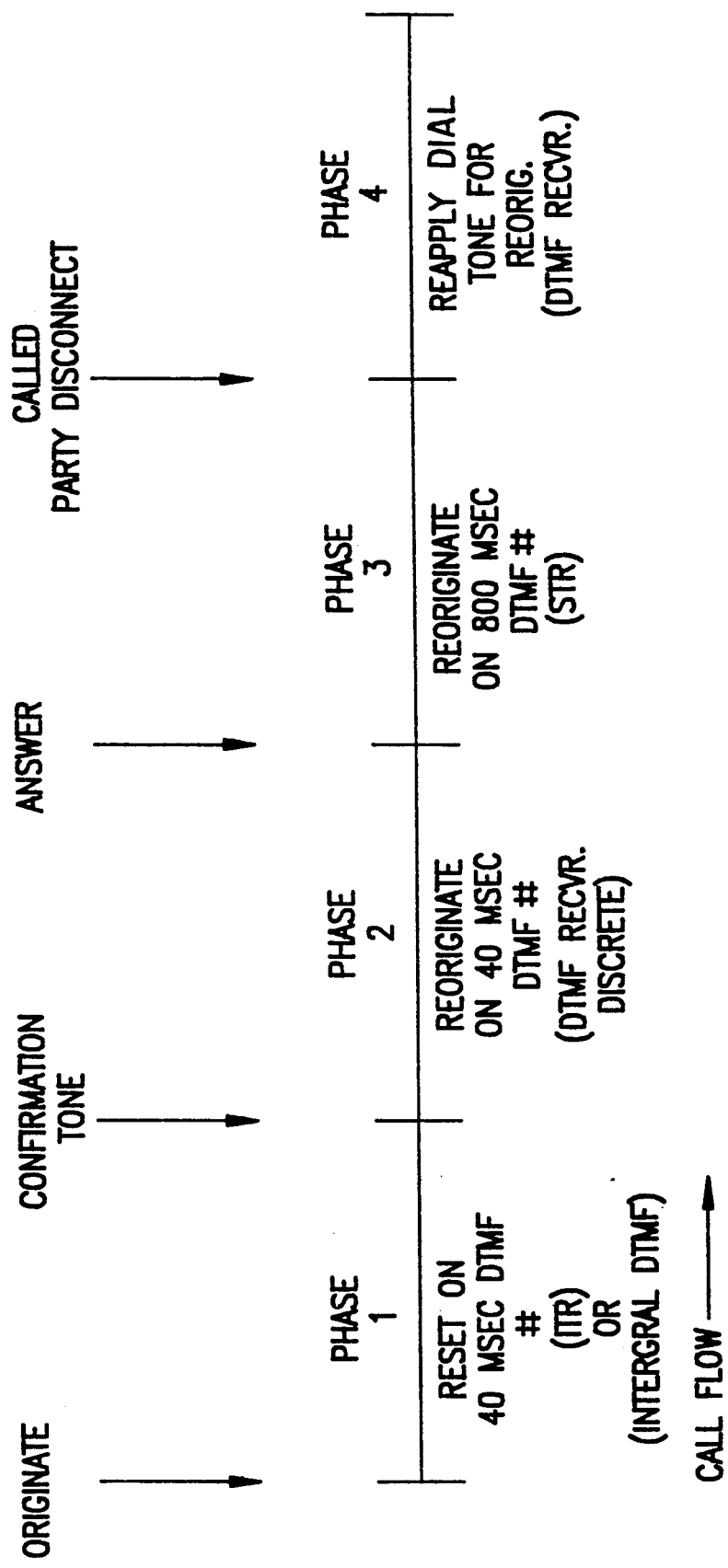
FIG. 2 is a call flow diagram showing the modes of detection for reorigination requests made during different phases of a call.
Figure 3:
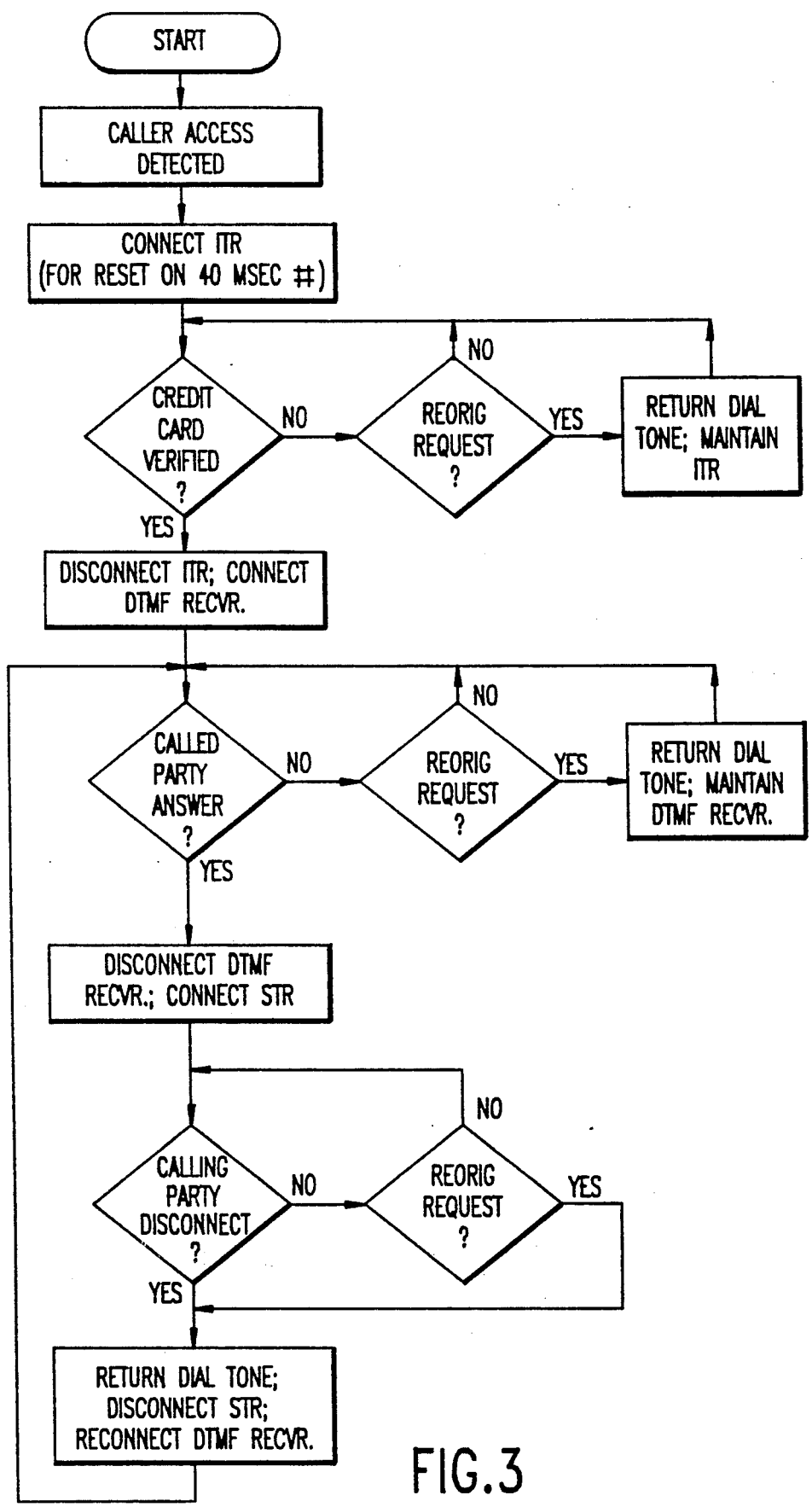
FIG. 3 is a flow chart showing the steps of the method for call reorigination.

The call flow diagram of FIG. 2, taken in connection with the flow chart of FIG. 3, further shows the reorigination process in accordance with the invention. During a first phase of the process, upon detection of caller access to the long distance carrier, by process steps 300 and 302, a tone receiver adapted to respond to short duration DTMF pulses is connected to collect the input digits from the caller's phone. The general requirement for this tone receiver is that it be able to detect the shorter duration pulses. It may, for example, be either a discrete DTMF receiver or an integrated tone receiver (ITR). For convenience here, and for conformity between FIGS. 1 and 3, an ITR will be presumed to be used.

Prior to credit card verification, the ITR (for example) stays on the line, although during this phase reorigination requests may occur (for example, the caller may recognize that he has incorrectly dialed). By process steps 304, 305, and 306 if a reorigination request occurs there is a reset, whereby dial tone is returned to the caller and the ITR is maintained on the line. Ultimately, by operation of step 304, the credit card number must be verified for the caller to proceed.

Once verification has occurred (at the confirmation tone), the ITR is disconnected and a discrete DTMF receiver (for example) is connected for monitoring and responding to DTMF tone inputs from the caller (step 308). The DTMF receiver, as a second mode of detection for reorigination requests, is also able to detect the shorter duration tones.

The DTMF receiver remains on the line until the called party answers. Reorigination requests are handled during this phase by process steps 310, 311, and 312. If a reorigination request is made at this point, dial tone is returned to the caller, the DTMF receiver remains on the line, and the process again awaits an answer by the called party.

Following answer by the called party, in a third phase of the process, at step 314, the DTMF receiver is replaced by an STR to provide the filtering effect desired while the caller and the called party are in communication.

In a preferred form of the invention, the caller may await disconnection by the called party (step 316), in which case the dial tone is automatically returned to the caller's phone without the need for a reorigination request (step 318). By this step, the DTMF receiver replaces the STR for detection of shorter duration reorigination requests. Alternatively, although not illustrated in FIG. 3, there may be a requirement for the caller to affirmatively request reorigination after calling party disconnect. In that event, step 318 would also be implemented.

If a reorigination request is made during the talking phase, this is recognized at process step 320 and the step 318 of returning dial tone and of replacing the STR with a DTMF receiver is also implemented.

Thus, overall, there is shown and described an invention which is operative to provide various and optimized modes of detection of a telephone call reorigination request, depending on the particular phase or stage of the call. While a preferred embodiment, and the best mode contemplated for carrying out the invention, have been described, it will be understood that various other modifications may be made therein. For example, while various tone receivers have been shown and described for detecting reorigination requests, those of skill in the art will recognize that it is entirely feasible to utilize other or different combinations of equivalent means responsive to DTMF tones, or to use less, or even a single tone receiver, and to change the response characteristics of the receiver (or receivers) depending on the phase of the process. It will also be recognized that the functionality of the invention may be achieved with various combinations of hardware and software. It is intended to claim all such modifications and variations which fall within the true spirit and scope of the invention.

What is claimed is:

1. A method for telephone call reorigination wherein reoriginations following an initial entry and verification of an authorization code are accomplished by the caller entering a reorigination command for each reorigination, comprising the steps of:
   (a) detecting the reorigination command during a calling time interval prior to the initial verification by using a first mode of detection;
   (b) following the initial verification, detecting the reorigination command for each call during each calling time interval prior to answer by a called party by using a second mode of detection;
   (c) detecting the reorigination command for each call during each calling time interval in which the caller and the called party are in communication by using a third mode of detection.

2. The method of claim 1 further including the step of:
   (d) returning a dial tone to the caller following a disconnection initiated by the called party and without requiring a reorigination command.

3. The method of claim 1 including the further step of:
   (d) detecting the reorigination command following a disconnection initiated by the called party by using a fourth mode of detection.

4. The method of claim 1 or 2 wherein the reorigination command is in the form of a DTMF tone; and
   (a) the first and second modes of detection are adapted to detect the reorigination DTMF tone when it is of at least a first minimum duration; and
   (b) the third mode of detection is adapted to detect the reorigination DTMF tone when it is of at least a second minimum duration, and wherein the second minimum duration is longer than the first minimum duration.

5. The method of claim 4 wherein the reorigination command is produced by activation of the # key of a DTMF telephone.

6. The method of claim 4 wherein the second minimum duration is of sufficient length to prevent spurious reoriginations from voice and background tones while the caller and called party are in communication.

7. The method of claim 6 wherein the first mode of detection is implemented with an integrated tone receiver, the second mode of detection is implemented with a discrete DTMF receiver, and the third mode of detection is implemented with a scanning tone receiver.

8. For use with a telephone call origination method of the type wherein origination requests are entered from the caller's telephone following an initial entry and verification of an authorization code, the improvement comprising the steps of: detecting each reorigination request prior to an answer response by a called party by using a first mode of detection and detecting each reorigination request during a period of communication between the caller and a called party by using a second mode of detection.

9. The method of claim 8 wherein the reorigination requests are entered by activating a key of a DTMF telephone, the first mode of detection includes the detection of a resultant DTMF tone of relatively shorter duration and the second mode of detection includes the detection of said resultant DTMF tone only when its duration exceeds a minimum duration longer than the shorter duration, said minimum duration being sufficient to prevent spurious reorigination during a telephone conversation.

10. A method for telephone call reorigination wherein reorigination is obtained by caller activation of a feature key on a DTMF telephone to produce a DTMF tone following an initial verification of caller authorization, comprising the steps of:
    (a) detecting the DTMF tone prior to verification whenever said tone is of at least a first minimum duration to thereby cause a continued requirement for verification;
    (b) following verification and prior to answer by a called party, detecting the DTMF tone when its duration is at least of said first minimum duration to thereby permit caller reorigination; and
    (c) during any period of communication between the caller and a called party, detecting the DTMF tone only when said tone is of at least a second minimum duration which is longer than the first and said second minimum duration is of sufficient length to prevent spurious reoriginations and to thereby permit reorigination only when said tone is at least of said second minimum duration.

11. A system for telephone call reorigination wherein reorigination is obtained by caller activation of a feature key on a DTMF telephone to produce a DTMF tone following an initial verification of caller authorization, comprising:
    (a) a first means, operative prior to verification, for detecting the DTMF tone whenever said tone is of at least a first minimum duration, said first means being responsive to cause a continued requirement for verification;
    (b) a second means, operative following verification and prior to answer by a called party, for detecting the DTMF tone when the tone duration is of at least said first minimum duration, said second means being responsive to thereby permit caller reorigination; and
    (c) a third means, operative during any period of communication between the caller and a called party, for detecting the DTMF tone only when said tone is of a second minimum duration which is longer than the first and of sufficient length to prevent spurious reoriginations and to thereby permit reorigination only when said tone is longer in duration than said second minimum duration.

12. The system of claim 11 wherein the first means includes an integrated tone receiver, the second means includes a discrete DTMF receiver, and the third means includes a scanning tone receiver.

* * * * *